United States Patent [19]
George et al.

[11] 4,371,204
[45] Feb. 1, 1983

[54] PIVOTAL ROOF VENT PANEL APPARATUS

[75] Inventors: Richard D. George, Brownstown; Gary L. Vanhulle, Woodhaven, both of Mich.

[73] Assignee: Skytrends, Inc., Warren, Mich.

[21] Appl. No.: 208,146

[22] Filed: Nov. 19, 1980

[51] Int. Cl.³ .............................................. B60J 7/08
[52] U.S. Cl. ..................................... 296/218; 49/465
[58] Field of Search .................. 296/218, 216; 74/520; 49/465; 403/93, 96

[56] References Cited

U.S. PATENT DOCUMENTS

| | | | |
|---|---|---|---|
| 1,226,324 | 5/1917 | Gage | 403/93 |
| 3,949,624 | 4/1976 | Bienert | 74/520 |
| 3,955,848 | 5/1976 | Lutz et al. | 296/137 B |
| 3,974,753 | 8/1976 | Blomgren et al. | 98/2.14 |
| 4,005,901 | 2/1977 | Lutke et al. | 296/137 B |
| 4,067,605 | 1/1978 | Green et al. | 296/137 B |
| 4,130,966 | 12/1978 | Kujawa, Jr. et al. | 49/141 |
| 4,193,628 | 3/1980 | Sorensen | 296/137 B |

FOREIGN PATENT DOCUMENTS

V7038  1/1956  Fed. Rep. of Germany ... 296/137 R

Primary Examiner—Robert R. Song
Attorney, Agent, or Firm—Basile, Weintraub & Hanlon

[57] ABSTRACT

A pivotal roof vent panel apparatus includes a frame adapted to be secured to the periphery of an opening in the roof of a vehicle to support a pivotal roof vent panel therein. The roof vent panel is pivotally disposed within the frame for pivotal movement about a front edge. A two part latch is connected to the rear edge of the roof vent panel at one end and is releasably connected to the frame at the other end. The latch acts as an over-center toggle linkage which forces the roof vent panel into secure engagement with the frame in a closed position and pivots the rear edge of the roof vent panel upward to a partially opened, venting position. A locking arrangement is carried by the latch for securely locking the latch in the extended, venting position.

11 Claims, 7 Drawing Figures

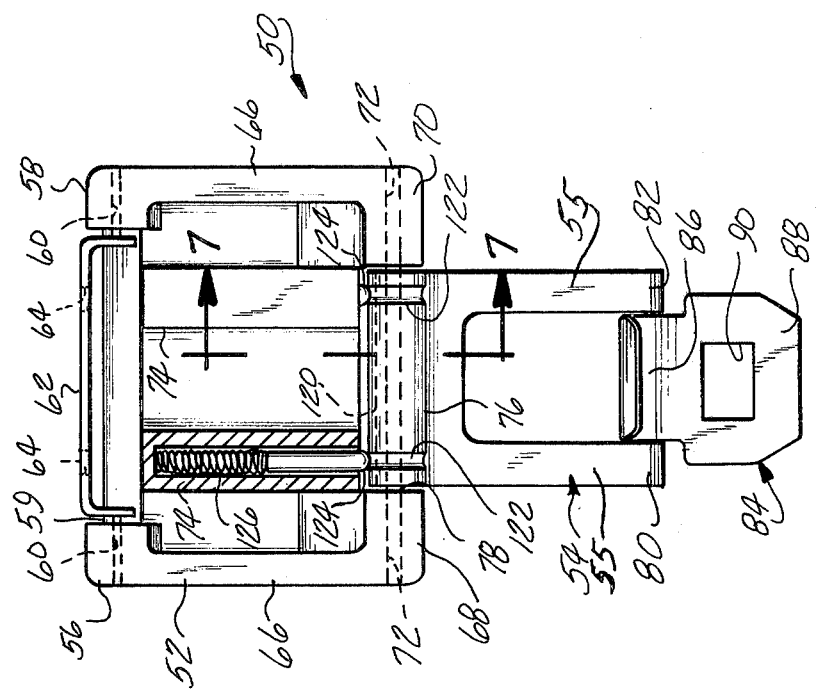
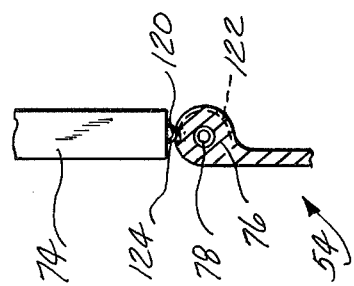

PIVOTAL ROOF VENT PANEL APPARATUS

BACKGROUND OF THE INVENTION

1. Field of the Invention

This invention relates, in general, to roof vent panels for vehicles and, more specifically, to roof vent panels which are pivotally and removably disposed within an opening in the roof of a vehicle.

2. Description of the Prior Art

It is known to provide a roof vent panel for vehicles having an opening in the roof thereof. Such roof vent panels are movable between closed and partially opened, venting positions to provide additional ventilation for the interior of the vehicle. It is also known to provide such roof vent panels that are adapted to be completely removed from the vehicles so as to open the interior of the vehicle to the external environment.

In moving the roof vent panel between the closed and venting positions, a latch mechanism is commonly used. The latch mechanism is typically affixed to the rear portion of the roof vent panel to releasably secure the roof vent panel in either of the closed or venting positions. Further, the latch mechanism is generally detachable from the stationary roof structure or from the roof vent panel so as to enable the roof vent panel to be completely removed from the roof opening of the vehicle.

A typical latch mechanism comprises a two part fastener of the toggle type which is pivotally connected together to enable the roof vent panel to be moved between the closed and venting positions. Such a latch usually includes means for separating one or both of the links of the latch from the stationary roof structure or from the roof vent panel so as to enable the roof vent panel to be completely removed from the roof opening. The separating means comprises a pin which is removed to disengage the connected components. It is also known to construct a latch mechanism which is releasably attached at one end to the roof vent panel or to the stationary roof structure.

However, in pivotal roof vent panel assemblies, it is necessary that the roof vent panel be securely held in the partially opened, venting position during the operation of the vehicle. In use, the vehicle commonly encounters rough terrain or bumps causing severe vibrations which exert forces on the latch mechanism which may result in its inadvertent collapse and, thereby, an undesired closure of the roof vent panel. Although the over-center toggle linkage commonly used in latch mechanisms functions satisfactorily to maintain the roof vent panel in the partially opened, venting position, a loosely constructed toggle linkage or one that has become loosened through wear and continued usage, may still inadvertently collapse.

Thus, it would be desirable to provide a roof vent panel apparatus which is pivotally and removably located in the roof opening of a vehicle and which overcomes the problems existing with prior art roof vent panel apparatus. It would also be desirable to provide a roof vent panel apparatus which incorporates a latch mechanism which securely locks the roof vent panel in the partially opened, venting position. Finally, it would be desirable to provide a roof vent panel apparatus which is simplistic in construction for both ease of operation and economical to manufacture.

SUMMARY OF THE INVENTION

There is disclosed herein a new and improved pivotal roof vent proof apparatus which is adapted to close an opening in the roof of a vehicle and to be pivoted about a front edge to a partially opened, venting position. The pivotal roof vent panel apparatus includes a frame adapted to be secured to the periphery of the roof opening of the vehicle. A roof vent panel is disposed within the frame for pivotal movement along a front edge thereof.

A two part latch is provided at the rear edge of the pivotal roof vent panel for raising and lowering the rear edge of the roof vent panel between a partially opened, venting position and a completely closed position. The latch comprises first and second links which are arranged as an over-center toggle linkage. The first and second links are pivotally connected together at one end. The opposed end of the second link has a tongue pivotally connected thereto. The tongue is releasably engageable with a catch mechanism supported within the frame for securing the latch to the frame or allowing the latch and the entire roof vent panel to the completely removed from the roof opening. The first link is pivotally connected at an opposite end to the rear edge of the roof vent panel.

Means are provided for securely locking the latch in the partially opened, venting position. The locking means includes a biased pin carried by the first link. The second link has a cylindrically shaped end portion formed with a circumferential groove which defines a path of travel for the pin. A transverse slot or aperture is formed at the end of the groove. The pin engages the aperture when the latch has been extended to the venting position to securely lock the latch in the extended position. As the first link is urged outward by the occupant of the vehicle, the pin is forced against the biasing means so as to be released from the aperture and engage the groove to permit the latch to be collapsed and the roof vent panel lowered to the closed position.

The pivotal roof vent panel apparatus of the present invention overcomes the problems of similar prior art apparatus in securely locking the roof vent panel in the partially opened, venting position despite the severe vibrations or forces exerted on the roof vent panel during the operation of the vehicle. Further, the roof vent panel apparatus of the present invention includes a latch mechanism which is constructed of relatively few components so as to contribute to ease of manufacture, use and economical costs.

BRIEF DESCRIPTION OF THE DRAWING

The various features, advantages and other uses of the present invention will become more apparent by referring to the following detailed description and drawing in which:

FIG. 3 is an elevational view of the latch mechanism shown generally in FIG. 1;

FIG. 7 is a partial sectional view, generally taken along line 7—7 in FIG. 3.

DESCRIPTION OF THE PREFERRED EMBODIMENTS

Throughout the following description and drawing, identical reference numbers are used to refer to the same component shown in multiple figures of the drawings.

Figure 1:
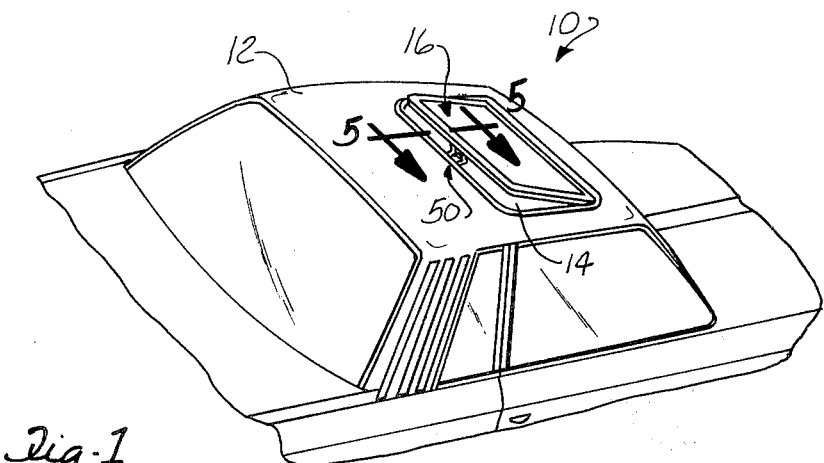
FIG. 1 is a partial, perspective view of a vehicle having a roof structure incorporating a pivotal roof vent panel apparatus constructed according to the teachings of the present invention.

Referring now to the drawing, and to FIG. 1 in particular, there is shown a partial perspective view of a vehicle 10 having a roof portion 12 with an opening 14 disposed therein. The roof opening 14 is adapted to receive a pivotal roof vent panel apparatus 16. The roof opening 14 has a substantially rectangular configuration and extends across the lateral width of the vehicle 10. Preferably, the roof opening 14 is located above the front seat of the vehicle 10. In addition, the opening 14 is cut or disposed within the roof 12 so as to be surrounded on all four sides by stationary roof structure.

The pivotal roof vent panel apparatus 16 is disposed within the opening 14 and is substantially the same shape as the opening 14 so as to fit in substantial registry and contiguity with the surface of the roof 12 when in the closed position. The pivotal roof vent panel apparatus 16 includes a frame assembly 18, FIG. 2, which is adapted to be secured to the periphery of the roof opening 14 by any conventional fastening means. The frame assembly 18 has substantially the shape as the roof opening 14 so as to fit in substantial registry and contiguity with the surface of the roof 12 when secured thereto.

Figure 6:
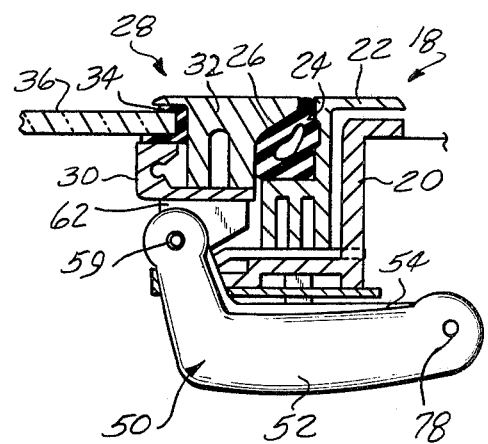
FIG. 6 is a sectional view, similar to FIG. 5, showing the position of the components of the latch in the fully closed position.

As shown in greater detail in FIG. 6, the frame assembly 18 comprises inner and outer frame members 20 and 22, respectively, which are secured together. The outer frame member 22 is formed with a seat portion 24 which supports a peripheral seal 26, such as a strip of rubber, neoprene and the like.

The frame assembly 18 supports a roof vent panel assembly 28. The roof panel assembly 28 comprises inner and outer frame members 30 and 32, respectively, which are secured together. A seal member 34 is disposed between the inner and outer frame members 30 and 32 to sealingly surround the periphery of a roof vent panel 36 which is supported between the inner and outer frame members 30 and 32.

The roof vent panel 36 is a substantially rectangular member having a slight concave lateral cross section similar to the concave shape of the roof 12 of the vehicle 10. Preferably, the roof vent panel 36 is formed of a transparent material, such as glass or plastic. Alternately, the roof panel 36 may be formed of an opaque material, such as metal, fiberglass and the like or it may be formed of a translucent glass or plastic.

Figure 2:
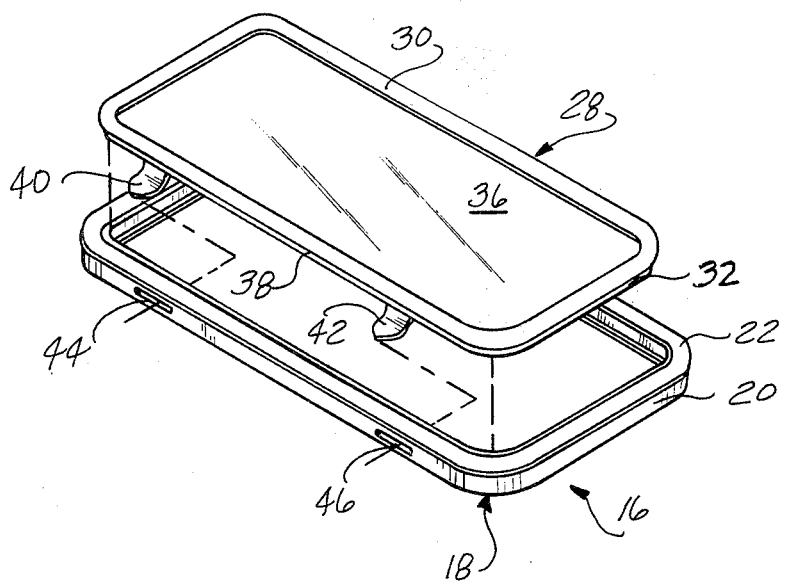
FIG. 2 is a partial, perspective view of the pivotal roof vent panel apparatus of the present invention.

As noted above, the roof panel assembly 28 is pivotally mounted within the frame assembly 18 about a front edge 38 thereof. A pair of spaced bayonets or tongues, 40 and 42, shown in FIG. 2, are secured to the underside of the front portion of the roof panel assembly 28 and extend outward therefrom. The bayonets 40 and 42 have an arcuate, upwardly extending flange portion which is adapted to be removably inserted within apertures 44 and 46 formed in the front portion of the frame assembly 18. The bayonets 40 and 42 are inserted into the apertures 44 and 46, respectively, and extend therethrough to provide a pivotal hinge for the roof panel assembly 28 which enables the roof panel assembly 28 to be pivoted about the front edge 38 as well as to be completely removed from the roof opening 14.

The roof vent panel apparatus 16 of the present invention includes a latch mechanism denoted in general by reference number 50 in FIG. 1 and shown in greater detail in FIGS. 3–7. The latch mechanism 50 is associated with the rear edge of the roof panel assembly 28 and enables the roof panel assembly 28 to be moved between a first partially opened, venting position in which the rear edge of the roof vent panel is disposed slightly above the roof 12 of the vehicle 10 and a fully closed position in which the roof vent panel completely closes the opening 14 in the roof 12 and is substantially flush or contiguous therewith.

As shown in FIG. 3, the latch mechanism 50 is in the form of a two-piece toggle linkage comprising first and second links 52 and 54, respectively.

The first link 52 is in the form of a solid body having a slightly arcuate configuration along its length. The first link 52 is formed with a pair of spaced, cylindrically shaped lobe portions 56 and 58 at one end thereof. Each of the lobe portions 56 and 58 is formed with a centrally disposed bore 60.

A substantially U-shaped bracket 62 is associated with the cylindrical lobes 56 and 58 and is adapted to be disposed therebetween. The bracket 62 has a substantially flat, central portion with apertures 64 formed therein adapted to receive suitable fasteners for connecting the bracket 62 to the underside of the inner frame member 30. Further, the depending legs of the bracket 62 have apertures formed therein which are aligned with the bores 60 in the lobes 56 and 58 such that a pivot pin or a roll pin 59 may be disposed through each aligned aperture and bore 60 to pivotally attach the first end of the first link 52 to the bracket 62, and thereby, to the rear edge of the roof panel assembly 28.

The first link 52 is preferably formed of an integrally molded plastic material and has raised side edges 66 which form a cup-like internal cavity on one side of the first link 52. Within the internal cavity in the first link 52, there is formed at least one, and preferably two, elongated hollow housings 74, the purpose of which will be described in greater detail hereafter. The second end of the first link 52 is also formed with a pair of spaced cylindrically shaped lobes 68 and 70. Each of the lobes 68 and 70 has a centrally formed bore 72 therein.

The latch mechanism 50 includes a second link 54. The second link 54 has a cylindrically shaped lobe portion 76 formed at one end thereof. The lobe portion 76 has a central bore which is adapted to be aligned with the bores 72 in the second lobe portions 68 and 70 of the first link 52. A conventional pivot or roll pin 78 may be inserted through the aligned bores to pivotally connect the first and second links 52 and 54 together.

The second link 54 is also formed with a pair of depending legs 55 which extend from the first cylindrical lobe portion 76 and terminate in a pair of spaced, aligned lobe portions 80 and 82. Both of the second lobe portions 80 and 82 have bores formed therein which are adapted to pivotally receive a tongue 84 therebetween by means of a pivot or roll pin 81.

The tongue 84 has a cylindrically shaped lobe portion 86 formed at one end thereof which is adapted to be disposed between the cylindrical lobes 80 and 82 on the second link 54 and to be pivotally connected therebetween. The tongue 84 has a flat portion 88 extending from the cylindrical lobe 86 which includes a central aperture 90. The tongue 84 is adapted to be removably inserted into aligned slots, not shown, formed in the rear portion of the inner and outer frame members 20 and 22 of the frame assembly 18 and to be releasably retained in a catch mechanism supported within the frame assembly 18 and denoted in general by reference number 100 in FIG. 4.

The catch mechanism 100 includes a movable member 102 which has a push button 104 formed at the lower end thereof. The movable member 102 has a central aperture 106 formed therein and a depending detent 108 which extends into the central aperture 106. The detent 108 has its lower end spaced a slight distance from the back surface of the push button 104.

Figure 4:
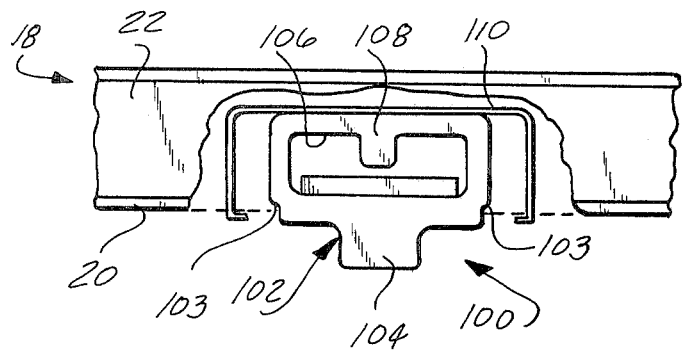
FIG. 4 is a partially broken, elevational view of the catch mechanism supported within the rear portion of the frame of the roof vent panel apparatus.

Biasing means 110 in the form of a leaf spring is provided for urging the movable member 102 downward in the orientation viewed in FIG. 4 such that the push button portion 104 extends through an aperture in the bottom of the frame assembly 18 into the interior of the vehicle 10. Shoulders 103 formed on the movable member 102 engage the frame 18 to retain the movable member 102 therein. The depending side ends of the leaf spring 110 extend through apertures in the bottom surface of the frame assembly 18 and are bent therearound to secure the spring in position. The central flat portion of the leaf spring 110 contacts the end of the movable member 102 so as to exert a downward biasing force on the movable member 102 and yet permit upward movement when finger pressure is exerted on the push button 104 of the movable member 102.

The flat portion 88 of the tongue 84 is adapted to be inserted in the aligned apertures in the frame assembly 18 until it contacts the detent 108 and urges the detent 108 upward against the bias of the spring 110. The detent 108 enters the central aperture 90 in the tongue 84 and moves downward under the bias of the spring 110 to lock the tongue 84 against further movement. In this manner, the latch mechanism 50 is securely connected to the frame assembly 18. The push button 104 may be pushed to remove the detent 108 from the central aperture 90 in the tongue 84 and to enable the tongue 84 to be removed from the aligned apertures in the frame assembly 18 to effect complete removal of the entire roof vent panel apparatus 16 from the frame 18 and the roof opening 14 of the vehicle 10.

Figure 5:
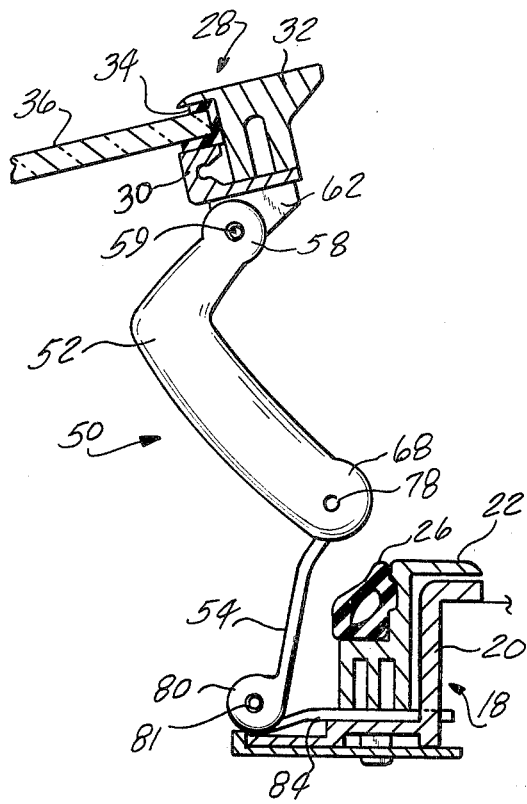
FIG. 5 is a sectional view, generally taken along line 5—5 in FIG. 1, showing the position of the components of the latch mechanism in the venting position.

With the tongue 84 securely retained with the catch mechanism 100, the first link 52 may be grasped and pivoted in an upward direction to raise the rear edge of the roof panel assembly 28 upward from the stationary roof structure 12 of the vehicle to the position shown in FIG. 5. The latch mechanism 50 is constructed with two stable states of an over-center condition. The first stable state occurs when the pivot pin 78 connecting one end of the first and second links 52 and 54 together has been pivoted rearward of the aligned hinged pins 59 and 81 at the other ends of the first and second links 52 and 54, respectively, as illustrated in FIG. 5. In this position, the latch mechanism 50 is maintained in a stable position which supports the roof vent panel in a partially opened, venting position.

When it is desired to lower the roof vent panel to the completely closed position, illustrated in FIG. 6, the first link 52 is grasped and pulled forward until the hinge pin 78 passes through the aligned hinge pins 59 and 81 thereby collapsing the latch mechanism 50 and lowering the roof vent panel to the closed position. Upon reaching the fully closed position, the latch mechanism 50 reaches its second stable state in which the hinge pin 78 connecting the first and second links 52 and 54 passes through the aligned hinge pins 59 and 81 to firmly hold the latch mechanism 50 in position and engage the roof vent panel assembly 28 with the seal strip 26 supported on the top of the outer frame member 22 of the frame assembly 18.

As shown in FIGS. 3 and 7, the pivotal roof vent panel apparatus 16 of the present invention also includes means for securely locking the latch mechanism 50 in the extended venting position. The locking means includes an aperture 120, preferably in the form of an elongated, laterally extending slot, which is formed in the cylindrical lobe 76 of the second link 54. Further, at least one and preferably a pair of spaced grooves 122 are formed on the surface of the cylindrical lobe 76. The grooves 122 extend from the slot 120 for a distance equal to approximately one quarter of the circumference of the cylindrical lobe 76.

A pair of pins 124 are disposed within the housings 74 formed on the first link 52 and extend outward to engage the slot 120 or the grooves 122 formed in the second link 54. Biasing means 126, preferably in the form of coil springs, are disposed within the housings 74 and seat upon the rear portion of the pins 124 to bias the pins in an outward direction from the housings 74.

As the latch mechanism 50 is moved from the closed to the opened position, the pins 124 ride along the grooves 122 in the second link 54 towards the slot 120. When the latch 50 reaches the fully extended position, the pins 124 engage the slot 120 and extend thereinto under the biasing effect of the springs 126. In this manner, the pins 124 are securely retained within the slot 120 which locks the latch mechanism 50 in the fully extended, venting position. This provides an added locking feature for the roof vent panel assembly 28 which maintains the roof vent panel in the partially opened, venting position in addition to the support provided by the over-center feature of the latch mechanism 50.

When it is desired to lower the roof vent panel assembly 28 to the fully closed position, movement of the first link 52 forces the pins 124 against the bias of the springs 126 which disengages the pins 124 from the slot 120 such that the pins 124 engage the grooves 122 in the cylindrical lobe 76 and move therealong as the latch mechanism 50 is collapsed to the closed position.

In summary, there has been disclosed herein a new and improved pivotal roof vent panel apparatus which is movable between a partially opened, venting position within an opening in the roof of a vehicle and a completely, closed sealing position. The roof vent panel apparatus includes a frame assembly adapted to be secured around the periphery of the opening in the roof of the vehicle. A pivotal roof vent panel assembly is disposed within the frame assembly for pivotal movement about a front edge thereof. A latch mechanism associated with the rear edge of the pivotal roof vent panel assembly selectively moves the roof panel between the venting and closed positons. Unique locking means are carried by the latch mechanism for securely locking the latch mechanism in the extended venting position. This unique locking means provides an additional locking capability for the latch mechanism which prevents any inadvertent collapsing of the latch mechanism which could result in an undesired closure of the roof vent panel during the operation of the vehicle.

What is claimed is:

1. A pivotal roof vent apparatus for a vehicle having an opening in the roof thereof comprising:
   a frame adapted to be secured around the periphery of said opening in the roof of said vehicle;
   a roof vent panel pivotally connected at a front edge to said frame;
   a latch connected to the rear edge of said roof vent panel, said latch being operative to move said roof vent panel between a first position wherein the rear edge of said roof vent panel extends above said roof opening and a second position wherein said roof vent panel closes said roof opening, said latch comprising:
   a first link connected to said rear edge of said roof vent panel;
   a second link pivotally connected to said first link at a first end;
   means, connected to the opposed end of said second link, for removably attaching said opposed end of said second link to said frame; and
   means carried by said first and second links for releasably locking said latch in the first venting position, said locking means comprising:
   an aperture formed in said second link;
   a biased pin carried by said first link, said pin releasably engaging said aperture in said second linking when said latch is moved to said first venting position for releasably locking said latch in said first venting position and being urged against the biasing force to disengage from said aperture when said first link is urged from the extended venting position.

2. A pivotal roof vent panel apparatus for a vehicle having an opening in the roof thereof comprising:
   a frame adapted to be secured around the periphery of said opening in the roof of said vehicle;
   a roof vent panel pivotally connected at a front edge to said frame;
   a latch connected to the rear edge of said roof vent panel, said latch being operative to move said roof vent panel between a first position wherein the rear edge of said roof vent panel extends above said roof opening and a second position wherein said roof vent panel closes said roof opening, said latch comprising:
   a first link connected to said rear edge of said roof vent panel;
   a second link pivotally connected to said first link at a first end;
   means, connected to the opposed end of said second link, for removably attaching said opposed end of said second link to said frame; and
   means carried by said first and second links for releasably locking said latch in the first venting position, the locking means including:
   an aperture formed in said second link;
   a biased pin carried by said first link, said pin releasably engaging said aperture in said second link when said latch is moved to said first venting position for releasably locking said latch in said first venting position;
   said second link further including a circumferential groove formed therein extending from said aperture, said groove defining a path of movement for said pin as said latch is moved between said first and second positions.

3. The apparatus of claim 2 wherein:
   the aperture is a slot extending laterally across the second link;
   the first link carries a pair of spaced, biased pins adapted to engage the slot; and
   the second link has a pair of spaced, circumferential grooves formed therein associated with said pins.

4. A pivotal roof vent panel apparatus for a vehicle having an opening in the roof thereof comprising:
   a frame adapted to be secured around the periphery of said opening in the roof of said vehicle;
   a roof vent panel pivotally connected at a front edge to said frame;
   a latch connected to the rear edge of said roof vent panel, said latch being operative to move said roof vent panel between a first position wherein the rear edge of said roof vent panel extends above said roof opening and a second position wherein said roof vent panel closes said roof opening, said latch comprising:
   a first link connected to said rear edge of said roof vent panel, the first link having a hollow housing formed therein;
   a pin carried by said hollow housing;
   biasing means disposed within said housing for biasing said pin outwardly therefrom;
   a second link pivotally connected to said first link at a first end;
   means, connected to the opposed end of said second link, for removably attaching said opposed end of said second link to said frame; and
   means carried by said first and second links for releasably locking said latch in the first venting position, the locking means including:
   an aperture formed in said second link;
   said pin releasably engaging said aperture in said second link when said latch is moved to said first venting position for releasably locking said latch in said first venting position.

5. A pivotal roof vent panel apparatus for a vehicle having an opening in the roof thereof comprising:
   a frame adapted to be secured around the periphery of said opening in the roof of said vehicle;
   a roof vent panel pivotally connected at a front edge of said frame;
   a latch connected to the rear edge of said roof vent panel, said latch being operative to move said roof vent panel between a first position wherein the rear edge of said roof vent panel extends above said roof opening and a second position wherein said roof vent panel closes said roof opening, said latch comprising:
   a first link connected to said rear edge of said roof vent panel;
   a second link pivotally connected to said first link at a first end;
   means, connected to the opposed end of said second link, for removably attaching said opposed end of said second link to said frame; and
   means carried by said first and second links for releasably locking said latch in the first venting position, said locking means comprising:
   a pair of spaced, hollow housings formed on said first link;
   a pair of pins disposed with said housings;

bias means disposed within said housings for urging the ends of said pins outward from the ends of said housings;

a transverse slot formed in said second link;

a pair of spaced circumferential grooves formed in said second link extending from said slot; and wherein said pins ride along said grooves as said latch is moved from said second to said first position and engage said slot when said latch is in said first position to lock said latch in said first position.

6. The apparatus of claim 1 wherein the attaching means comprises:

a tongue pivotally connected to the opposed end of the second link;

a catch mounted to the frame and adapted to receive said tongue;

a detent carried by said catch for movement between a first position wherein it engages said tongue to retain said tongue in said catch and a second position wherein it allows said tongue to be removed from said catch;

means for biasing said detent to said first position; and manually actuable means for moving said detent to said second position such that said tongue can be removed from said catch.

7. The apparatus of claim 1 wherein:

the frame has a pair of spaced slots formed along the front edge thereof; and a pair of spaced, arcuate bayonets are secured to and extend from the front edge of the roof vent panel and are adapted to releasably engage said slots in said frame to define a hinge for said roof vent panel.

8. A pivotal roof vent panel apparatus for a vehicle having an opening in a roof thereof comprising:

a frame adapted to be secured around the periphery of said roof opening;

a roof vent panel pivotally connected at a front edge to said frame;

a latch connected to the rear edge of said roof vent panel, said latch comprising:

a first link pivotally connected to said rear edge of said roof vent panel;

a second link pivotally connected to said first link at a first end;

a tongue pivotally connected to said second link at a second end;

a catch supported on said frame and adapted to receive said tongue;

said tongue being adapted to releasably engage said catch for attaching said latch to said frame;

a detent carried by said catch for movement between a first position wherein it engages said tongue to retain said tongue in said catch and a second position wherein it allows said tongue to be removed from said catch;

means for biasing said detent to said first position;

manually actuable means for moving said detent to said second position such that said tongue can be removed from said catch;

a pair of spaced hollow housings formed on said first link;

biasing means disposed within said housing;

a pair of pins disposed within said housings and biased outwardly therefrom by said biasing means;

a transverse slot formed in said second link;

a pair of circumferential grooves extending perpendicularly from said slot, said pins moving along said grooves as said first and second links pivot; and wherein said pins engage said slot in said second link when said latch has been moved to a first, extended position to lock said latch in said first extended position.

9. A latch for roof vent panel which is pivotally disposed within an opening in a roof of a vehicle comprising:

a first link adapted to be connected to the rear edge of said roof vent panel;

a second link pivotally connected to said first link at one end;

means for removably attaching the opposed end of said second link to said vehicle; and means, carried by said first and second links, for releasably locking said latch in a first extended position, the locking means comprising:

a slot formed in said first link; and a biased pin carried by said first link and adapted to engage said slot when said latch has been moved to said first extended position to securely lock said latch in said extended position and being urged against the biasing means to disengage from said slot when said first link is urged from said first extended position.

10. A latch for roof vent panel which is pivotally disposed within an opening in a roof of a vehicle comprising:

a first link adapted to be connected to the rear edge of said roof vent panel;

a second link pivotally connected to said first link at one end;

means for removably attaching the opposed end of said second link to said vehicle; and means, carried by said first and second links, for releasably locking said latch in a first extended position, the locking means comprising:

a slot formed in said second link;

a biased pin carried by said first link and adapted to engage said slot when said latch has been moved to said first extended position to securely lock said latch in said extended position; and said second link has a circumferential groove extending perpendicularly from said slot.

11. The latch of claim 10 wherein the second link has a pair of spaced circumferential grooves formed therein and;

the first link carries a pair of spaced biased pins adapted to ride along said grooves.

* * * * *